United States Patent [19]

Quemerais et al.

[11] 4,223,571
[45] Sep. 23, 1980

[54] TRANSMISSION WITH EPICYCLOIDAL TRAIN

[75] Inventors: Philippe Quemerais, Villepreux; Jean Vèron, Suresnes, both of France

[73] Assignee: Regie Nationale des Usines Renault, Boulogne-Billancourt, France

[21] Appl. No.: 866,378

[22] Filed: Jan. 3, 1978

[30] Foreign Application Priority Data

Jan. 11, 1977 [FR] France ............................. 77 00562

[51] Int. Cl.² ........................................... F16H 3/74
[52] U.S. Cl. ................................. 74/759; 74/764
[58] Field of Search .............. 74/753, 758, 759, 760, 74/764, 766, 768, 770

[56] References Cited

U.S. PATENT DOCUMENTS

| | | | |
|---|---|---|---|
| 3,824,876 | 7/1974 | Mori et al. | 74/759 |
| 3,956,946 | 5/1976 | Murakami et al. | 74/753 X |
| 4,046,031 | 9/1977 | Ott et al. | 74/764 |

*Primary Examiner*—C. J. Husar
*Assistant Examiner*—Frank McKenzie
*Attorney, Agent, or Firm*—Oblon, Fisher, Spivak, McClelland & Maier

[57] ABSTRACT

A transmission with epicyclic trains which includes four epicyclic trains permitting six forward speed ratios and one in reverse. With this transmission it is possible to obtain, by elimination of elements such as an annulus, brake bands or clutches, combinations of three, four and five forward speed ratios and one in reverse and is applicable to automobiles, buses and industrial vehicles.

8 Claims, 8 Drawing Figures

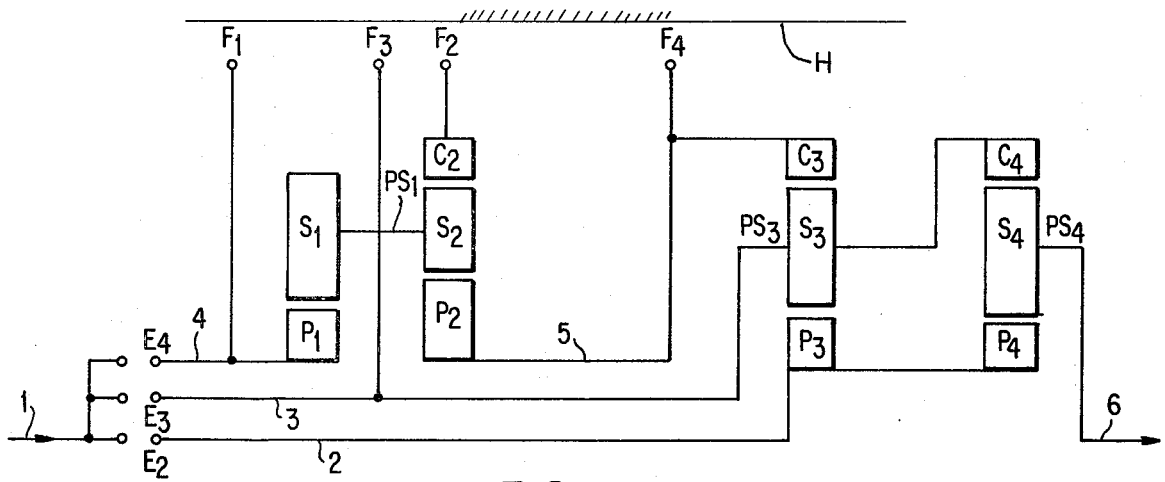
FIG.1
FIG.2
FIG.4
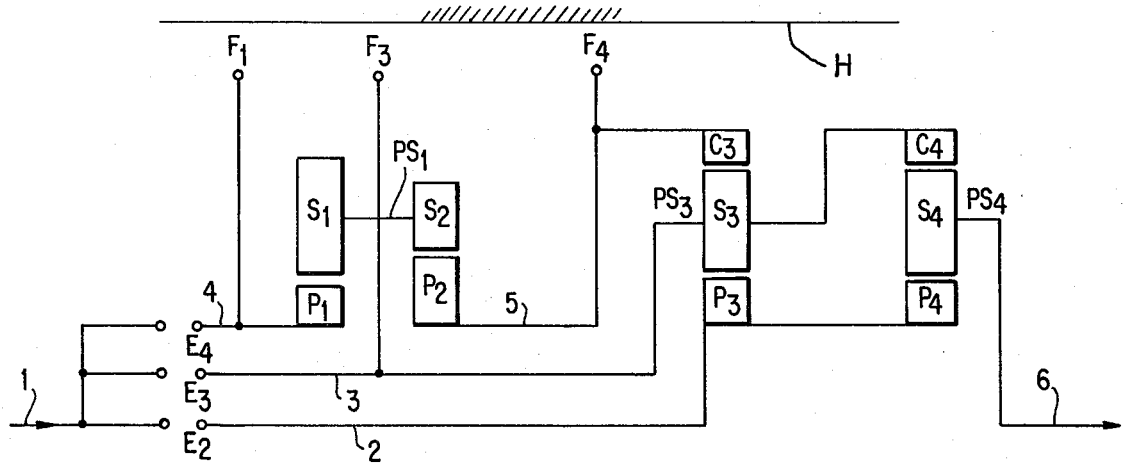
FIG.3

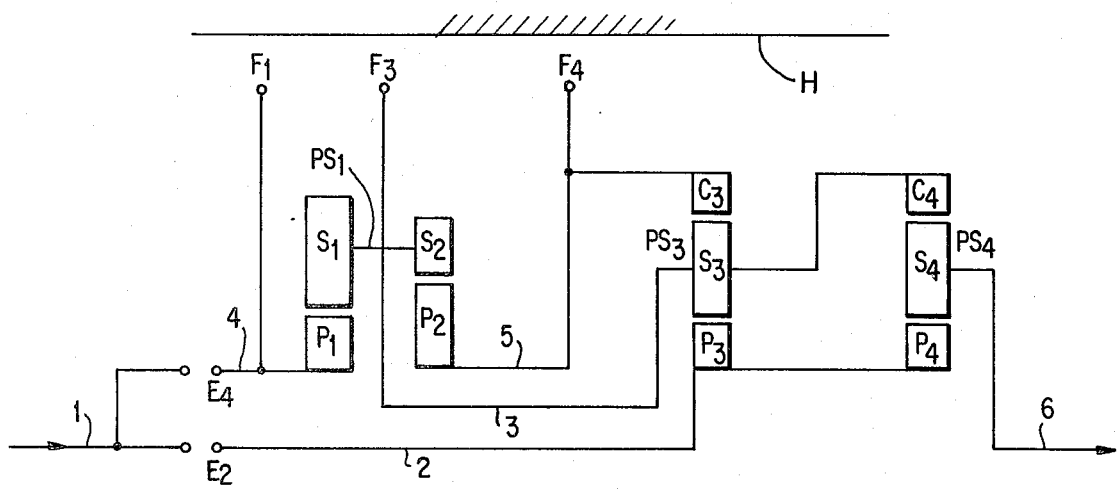
FIG. 5
|   | E2 | E4 | F1 | F3 | F4 |
|---|---|---|---|---|---|
| 1 | * |   |   | * |   |
| 2 | * |   |   |   | * |
| 3 | * |   | * |   |   |
| 4 | * | * |   |   |   |
| AR |   | * |   | * |   |
FIG. 6
|   | E2 | E4 | F3 | F4 |
|---|---|---|---|---|
| 1 | * |   | * |   |
| 2 | * |   |   | * |
| 3 | * | * |   |   |
| AR |   | * | * |   |
FIG. 8
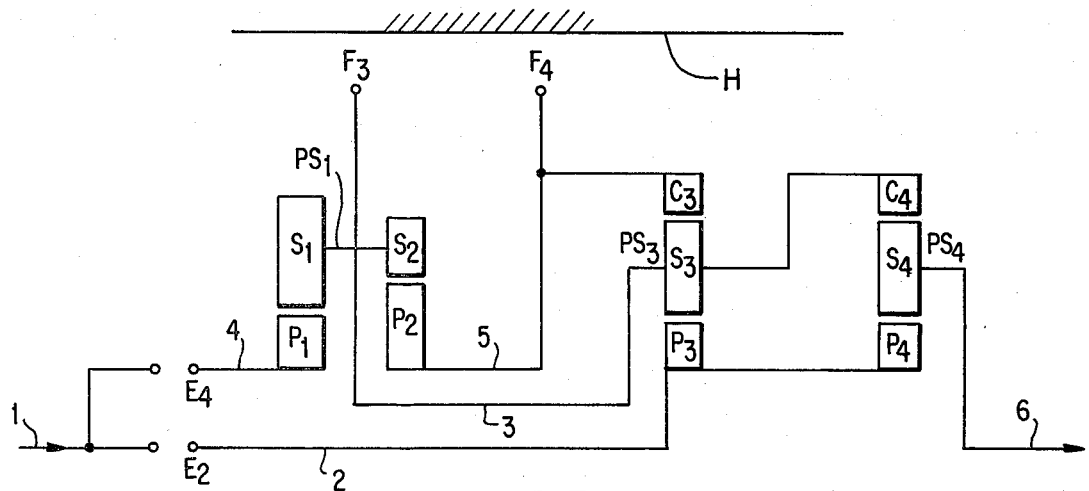
FIG. 7

TRANSMISSION WITH EPICYCLOIDAL TRAIN

BACKGROUND OF THE INVENTION

1. Field of the Invention

The present invention is directed to a transmission with epicyclic trains, particularly for automobiles, buses and industrial vehicles.

2. Description of the Prior Art

There exist mechanisms which, to answer a special need, are realized by means of combining a plurality partial mechanisms such that each of the latter has its own place in a housing and constitutes a removable subassembly. Such a basic mechanism generally has a minimum number of speeds forward and in reverse and as such, suffices, in order to obtain a higher number of speeds, to add one or more of the above-noted necessary partial mechanisms.

This arrangement, while being very flexible, demands the provision for partial mechanisms having complete autonomy from a kinematic point of view and entails, on the whole, a very complicated fabrication with a larger number of elements such as planetary trains, shafts, clutches and brakes than would be utilized in a compact assembly.

To obtain a large number of speeds, it is also possible to dispose such partial mechanisms in series so that the total number of speed ratios is obtained by multiplication of the numbers of speed ratios of each of the partial mechanisms. Evenso, this arrangement, also called a staged mechanism, poses very difficult problems with respect to speed shifting in automatic assemblies.

Furthermore, arrangements with epicyclic trains are also known which allow several speeds forward and several in reverse. These arrangements consist of a compact assembly designed to give the maximum number of speed ratios anticipated and allow smaller numbers of speed ratios by the elimination of clutches, brakes or kinematic elements such as annuli, sun wheels or planet wheels. However, these arrangements, for example in the case of an assembly with six forward speeds and one in reverse, entail a necessarily complicated assembly because of the positioning of the various clutches, different brakes and complex couplings between the various elements of the epicyclic trains.

The essential object of the present invention is the realization of a transmission gear box with epicyclic trains permitting six forward speed ratios and one in reverse, utilizing minimumal mechanical elements such as annuli, planet wheels, sun wheels, clutches and brakes, to name the main elements only.

The transmission box of the present invention is designed so as to obtain easy shifting under load, which results from the fact that shifting from one speed ratio to a ratio directly above or under the speed ratio is effected by a transferring action from a single friction clutch or brake element to another single friction clutch or brake element. The kinematic chain selected permits passing easily from a box with six forward speed ratios to one with five ratios by the elimination of one annulus and one brake characteristic of conventional assemblies.

Similarly, it is possible to obtain a box with four forward speed ratios by the elimination of an annulus, a brake and a clutch in the six-speed box, and one with three forward speed ratios by eliminating an annulus, two brakes and a clutch in the six-speed box.

BRIEF DESCRIPTION OF THE DRAWINGS

Various other objects and many of the attendant advantages of the present invention will be readily appreciated as the same becomes better understood by reference to the following detailed description when considered in connection with the accompanying drawings, in which like reference characters designate the same or similar parts throughout the figures thereof and wherein:

FIG. 1 is a schematic view of a longitudinal cross section through the middle of a box with 6 forward speed ratios and 1 ratio in reverse, FIG. 2 is a table indicating the clutches and brakes applied for each of the speeds of the mechanism of FIG. 1, FIG. 3 is a schematic view of a longitudinal cross section through the middle of a box with five forward speed ratios and one in reverse, FIG. 4 is a table indicating the clutches and brakes applied for each of the speeds of the mechanism of FIG. 3, FIG. 5 is a schematic view of a longitudinal section through the middle of a box with four forward speed ratios and one in reverse, FIG. 6 is a table indicating the clutches and brakes applied for each of the speeds of the mechanism of FIG. 5, FIG. 7 is a schematic view of a longitudinal section through the middle of a box with three forward speed ratios and one in reverse, and FIG. 8 is a table indicting the clutches and brakes applied for each of the speeds of the mechanism of FIG. 7.

DETAILED DESCRIPTION OF THE PREFERRED EMBODIMENTS

FIG. 1 shows the arrangement of a first embodiment of the transmission gear box of the present invention with four plane epicyclic trains. Proceeding from left to right as shown in FIG. 1; the first epicyclic train comprises a sun wheel P1 engaging one (or more) planet wheel(s) S1; the second epicyclic train comprises a sun wheel P2 engaging one (or more) planet wheel(s) S2, in turn, engaging an annulus C2; the third epicyclic train consists of a sun wheel P3 which engages one (or more) planet wheel(s) S3 engaging an annulus C3; and the fourth epicyclic train has a sun wheel P4 meshing with one (or more) planet wheels S4 meshing, in turn, with an annulus C4.

The input motion to the transmission is by way of input shaft 1. The input shaft 1 can communicate this input motion to a shaft 2 by the intermediary of a clutch E2, to a shaft 3 by the intermediary of a clutch E3, and to a shaft 4 by the intermediary of a clutch E4 with shafts 2, 3 and 4 being coaxial.

The shaft 2 is fixed in rotation to the sun wheels P3 and P4 while shaft 3 is fixed in rotation to a planet wheel cage PS1, a planet wheel cage PS3 and the annulus C4. The planet wheel cage PS1 carries one (or more) planet wheel(s) S1 and one (or more) planet wheel(s) S2, each planet wheel S1 being fixed in rotation to a planet wheel S2. The planet wheel cage PS3 carries one (or more) planet wheel(s) S3.

The shaft 4 is fixed in rotation to sun wheel P1 while the sun wheel P2 is fixed in rotation to the annulus C3 by way of a shaft 5. The planet wheel cage PS4 carries the planet wheel(s) S4.

A brake F1 can lock the shaft 4 and, consequently, the sun wheel P1 while brake F2 serves to lock the annulus C2 as desired. A brake F3 can lock the planet wheel cage PS1 and, consequently, the shaft 3, the planet wheel cage PS3 and the annulus C4. Moreover, a brake F4 can lockably engage the shaft 5 and, consequently, the sun wheel P2 and the annulus C3.

FIG. 2 is a table of the sequence of operations in the transmission gear box schematically shown in FIG. 1 in order to provide six forward ratios and one in reverse. To obtain each speed, the following elements must be actuated; for the first forward speed, clutch E2 and brake F2; for the second forward speed, clutch E2 and brake F3; for the third forward speed, clutch E2 and brake F4; for the fourth forward speed, clutch E2 and brake F1; for the fifth forward speed, clutches E2 and E3; for the sixth forward speed, clutch E3 and brake F1; and, for reverse, clutch E4 and brake F3.

FIG. 3 shows the arrangement of a second embodiment of the transmission gear box of the present invention with four epicyclic trains derived from the first embodiment represented by FIG. 1 by elimination of the annulus C2 and the brake F2.

FIG. 4 is the table of the sequence of operations in the transmission gear box schematically illustrated in FIG. 3 in order to provide five forward ratios and one in reverse. To obtain each speed, the following elements must be actuated; for the first forward speed, clutch E2 and brake F3; for the second forward speed, clutch E2 and brake F4; for the third forward speed, clutch E2 and brake F1; for the fourth forward speed, clutches E2 and E3; for the fifth forward speed, clutch E3 and brake F1; and, for reverse, clutch E4 and brake F3.

FIG. 5 represents the arrangement of a third embodiment of the transmission gear box of the present invention with four epicyclic trains, derived from the transmission gear box represented in FIG. 1 by eliminating the annulus C2, the brake F2 and the clutch E3.

FIG. 6 is the table of the sequence of operations in the transmission gear box schematically illustrated in FIG. 5, for providing four forward ratios and one in reverse. To obtain each speed it is necessary to actuate the following elements; for the first forward speed, clutch E2 and brake F3; for the second forward speed, clutch E2 and brake F4; for the third forward speed, clutch E2 and brake F1; for the fourth forward speed, clutches E2 and E4; and, for reverse, clutch E4 and brake F3.

FIG. 7 shows the arrangement of a fourth embodiment of the transmission gear box of the present invention with four epicyclic trains, derived from that of FIG. 1 by elimination of the annulus C2, the brake F2, clutch E3 and brake F1.

FIG. 8 is the table of the sequence of operations in the transmission gear box shown schematically in FIG. 7, for providing three forward ratios and one in reverse. To obtain each speed, the following elements must be actuated; for the first forward speed, clutch E2 and brake F3; for the second forward speed, clutch E2 and brake F4; for the third forward speed, clutches E2 and E4; and, for reverse, clutch E4 and brake F3.

Obviously, many modifications and variations of the present invention are possible in light of the above teachines. It is therefore to be understood that within the scope of the appended claims, the invention may be practiced otherwise than as specifically described herein.

What is claimed as new and desired to be secured by letters patent of the United States is:

1. A transmission with epicyclic trains which comprises:
   a housing;
   a first (PS1), second (PS3) and third (PS4) planet wheel cage disposed within said housing;
   a first (S1) and second (S2) planet wheel connected with said first (PS1) planet wheel cage;
   a third (S3) and fourth (S4) planet wheel connected to said second (PS3) and third (PS4) planet wheel cage, respectively;
   a first (P1) and second (P2) sun wheel connected to said first (S1) and second (S2) planet wheel, respectively;
   a third (P3) and fourth (P4) interconnected sun wheel engaging said second (PS3) and third (PS4) planet wheel cage, respectively;
   a first (C3) and second (C4) annulus drivingly connected to said second (PS3) and third (PS4) planet wheel cage, respectively, said second (C4) annulus interconnecting said second (PS3) and third (PS4) planet wheel cage;
   a first (E2) and second (E3) clutch;
   a first (2), second (3), third (4), and fourth (5) shaft, said first shaft (2) interconnecting said first clutch (E2) to said third (P3) sun wheel, said second shaft (3) interconnecting said first (PS1) and said second (PS3) planet wheel cage, said third (4) shaft interconnecting said second (E3) clutch and said first sun wheel (P1), and said fourth (5) shaft interconnecting said second (P2) sun wheel and said first (C3) annulus;
   an input shaft (1) connected to said first (E2) and said second (E4) clutch and an output shaft (6) connected to said third (PS4) planet wheel cage; and
   a first (F3) brake interconnecting said housing and said first (PS1) planet wheel cage for locking said first (PS1) planet wheel cage and a second brake (F4) interconnecting said housing and said fourth shaft (5) for locking said second (P2) sun wheel wherein all shafts under loads are accomplished by transfer of a single coupling action to another single coupling action.

2. A transmission with epicyclic trains as set forth in claim 1, which further comprises;
   a third brake (F1) interconnecting said third shaft (4) with said housing for locking said first (P1) sun wheel.

3. A transmission with epicyclic trains as set forth in claim 1, which further comprises;
   a third clutch (E3) interconnecting said second (3) shaft and said input (1) shaft.

4. A transmission with epicyclic trains as set forth in claim 1, which further comprises:
   a third annulus (C2) engaging said second (S2) planet wheel and a fourth (F2) brake interconnecting said housing with said third (C2) annulus for locking said third (C2) annulus.

5. A transmission with epicyclic trains as set forth in claim 1, wherein:
   three forward speeds and one speed in reverse are obtained by actuating for the first forward speed, first clutch (E2) and first brake (F3); for the second forward speed, first clutch (E2) and second brake (F4); for the third forward speed first and second clutches (E2 and E4); and for reverse, second clutch (E4) and first brake (F3).

6. A transmission with epicyclic trains as set forth in claim 2, wherein;

four forward speeds and one speed in reverse are obtained by actuating, for the first forward speed, first clutch (E2) and first brake (F3); for the second forward speed, first clutch (E2) and second brake (F4); for the third forward speed, first clutch (E2) and third brake (F1); for the fourth forward speed, first and second clutches (E2 and E4); and, for reverse, second clutch (E4) and first brake (F3).

7. A transmission with epicyclic trains as set forth in claim 3, wherein;
five forward speeds and one speed in reverse are obtained by actuating for the first forward speed, first clutch (E2) and first brake (F3); for the second forward speed, first clutch (E2) and second brake (F4); for the third forward speed, first clutch (E2) and third brake (F1); for the fourth forward speed, first clutch (E2) and third clutch (E3); for the fifth forward speed, third clutch (E3) and third brake (F1); and, for reverse, second clutch (E4) and first brake (F3).

8. A transmission with epicyclic trains as set forth in claim 4, wherein;
six forward speeds and one speed in reverse are obtained by actuating, for the first forward speed, first clutch (E2) and fourth brake (F2); for the second forward speed, first clutch (E2) and first brake (F3); for the third forward speed, first clutch (E2) and second brake (F4); for the fourth forward speed, first clutch (E2) and third brake (F1); for the fifth forward speed, first and third clutches (E2 and E3); for the sixth forward speed, third clutch (E3) and third brake (F1); and, for reverse, second clutch (E4) and first brake (F3).

* * * * *